C. FARMES.
ARTIFICIAL BAIT.
APPLICATION FILED SEPT. 4, 1917.
1,251,994.
Patented Jan. 1, 1918.
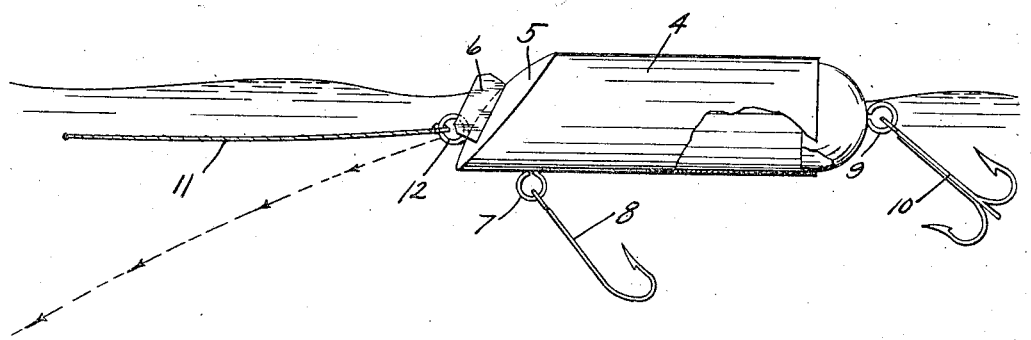
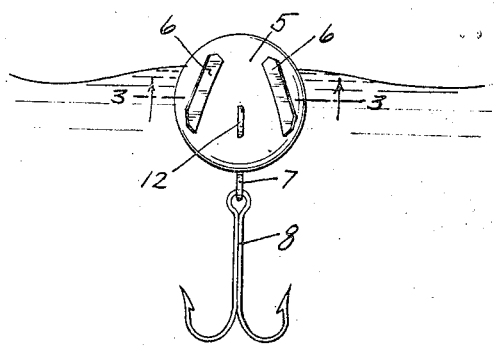
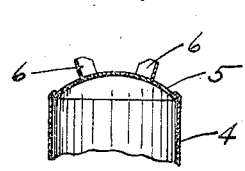
WITNESSES
M. F. Williamson
E. E. Wells
INVENTOR
Charles Farmes
BY HIS ATTORNEYS
Williamson Merchant

UNITED STATES PATENT OFFICE.

CHARLES FARMES, OF MINNEAPOLIS, MINNESOTA, ASSIGNOR OF ONE-HALF TO JOSEPH M. MARTIN, OF MINNEAPOLIS, MINNESOTA.

ARTIFICIAL BAIT.

1,251,994.     Specification of Letters Patent.     Patented Jan. 1, 1918.

Application filed September 4, 1917. Serial No. 189,429.

*To all whom it may concern:*

Be it known that I, CHARLES FARMES, a citizen of the United States, residing at Minneapolis, in the county of Hennepin and State of Minnesota, have invented certain new and useful Improvements in Artificial Bait; and do hereby declare the following to be a full, clear, and exact description of the invention, such as will enable others skilled in the art to which it appertains to make and use the same.

My invention has for its object to provide an improved artificial bait of the type generally known as "wabblers" and which imitate very closely the movement of a minnow or small fish in the water.

To the above end, the invention consists of the novel devices and combinations of devices hereinafter described and defined in the claims.

In the accompanying drawings which illustrate the invention, like characters indicate like parts throughout the several views.

Referring to the drawings:

Figure 1 is a view in side elevation, with some parts sectioned, showing the improved bait in the water;

Fig. 2 is a front elevation of the bait in the water with the fish line detached therefrom; and Fig. 3 is a detail view in central horizontal section taken on the line 3—3 of Fig. 2.

The bait body 4 is hollow and, as shown, is made from sheet metal, preferably nickel plated brass, with an air chamber of sufficient capacity to float the bait when still. The front end 5 of the bait is convex in cross-section and is beveled forwardly and downwardly so that when the bait is pulled through the water the same will travel below the surface thereof, as indicated by broken lines in Fig. 1. To this beveled front end 5 is secured a pair of upwardly converging wings 6 which project forwardly and are turned slightly outward.

Secured to the under side of the body 4, near the beveled front end thereof, is an eye 7 to which is attached a cluster of hooks 8 and to the rear end of said body is also attached an eye 9 to which is secured a cluster of hooks 10. A fish line 11 is attached to the beveled front end 5, below the horizontal axis of the body 4, by means of an eye 12.

The water in passing between the upwardly converging wings 6, as the bait travels through the water, imparts to said bait the required movement to imitate a minnow or small fish in the water and the glossy finish thereof has, in actual usage, proven to be an attractive bait. By making the bait of metal the same is very light and durable and the eyes 7, 9 and 12 may be secured thereto in various different ways so that they cannot pull out. The above described bait has many advantages over baits made from wood and enameled for the reason that the enamel on such baits soon peals or chips off and the body becomes water soaked, thereby decreasing the efficiency of the bait. In these wooden baits screw eyes are commonly used to secure the hooks and line thereto, and they soon become loose and pull out very easily.

What I claim is:

1. An artificial bait having a cylindrical body with a downwardly inclined convex head, the axis of which obliquely intersects the axis of said body.

2. An artificial bait having a cylindrical body with a downwardly inclined convex head, the axis of which obliquely intersects the axis of said body, and a pair of wings on said head.

3. An artificial bait having a cylindrical body with a head end that is inclined from the top to the bottom of said body, and a pair of outwardly diverging and upwardly converging wings on the head.

In testimony whereof I affix my signature in presence of two witnesses.

CHARLES FARMES.

Witnesses:
CLARA DEMAREST,
HARRY D. KILGORE.

Copies of this patent may be obtained for five cents each, by addressing the "Commissioner of Patents, Washington, D. C."